United States Patent [19]
Tsuchiye

[11] 3,927,743
[45] Dec. 23, 1975

[54] COASTER BRAKE FOR A BICYCLE
[75] Inventor: Kimihiro Tsuchiye, Sakai, Japan
[73] Assignee: Shimano Industrial Company, Limited, Osaka, Japan
[22] Filed: May 28, 1974
[21] Appl. No.: 473,832

[30] Foreign Application Priority Data
May 31, 1973 Japan.................. 48-62211
Nov. 13, 1973 Japan.................. 48-127985

[52] U.S. Cl. .................................. 192/6 R; 192/6 R
[51] Int. Cl.² .................................. F16D 67/02
[58] Field of Search .................................. 192/6 R

[56] References Cited
UNITED STATES PATENTS
939,411   11/1909   Gottschalk .................. 192/6 R
1,023,347   4/1912   Whittington .................. 192/6 R
1,066,353   7/1913   Winfrey .................. 192/6 R FOREIGN PATENTS OR APPLICATIONS
288,726   10/1912   Germany .................. 192/6 R Primary Examiner—Benjamin W. Wyche
Attorney, Agent, or Firm—Stevens, Davis, Miller & Mosher

[57] ABSTRACT

A coaster brake hub for a bicycle is provided with a clutch spring between a clutch cone and a brake cone, which is adapted to apply a predetermined rotary resistance on the clutch cone for causing the clutch cone to be rapidly axially moved when a driving means of the hub is reversely rotated by back pedaling for brake action so that a cyclist can exert brake action of a bicycle quickly and exactly and also rapidly remove brake action when reverse rotation by pedals is released over the brake action.

5 Claims, 4 Drawing Figures

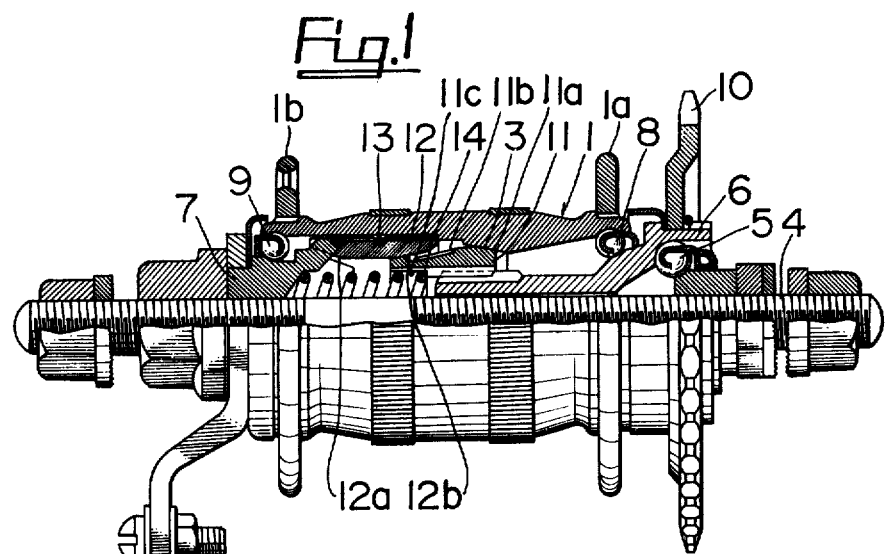
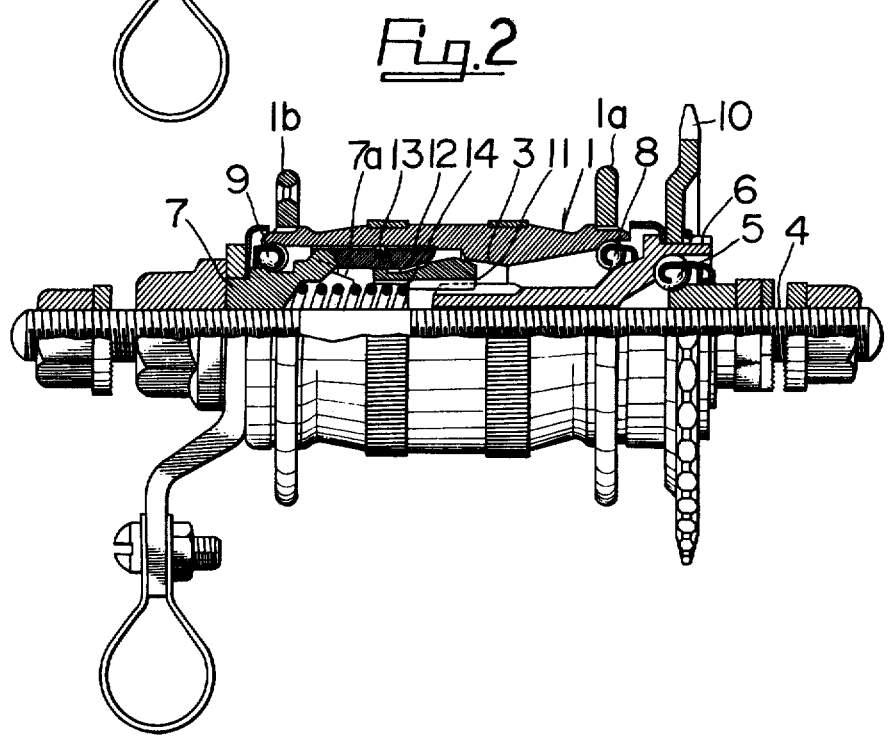

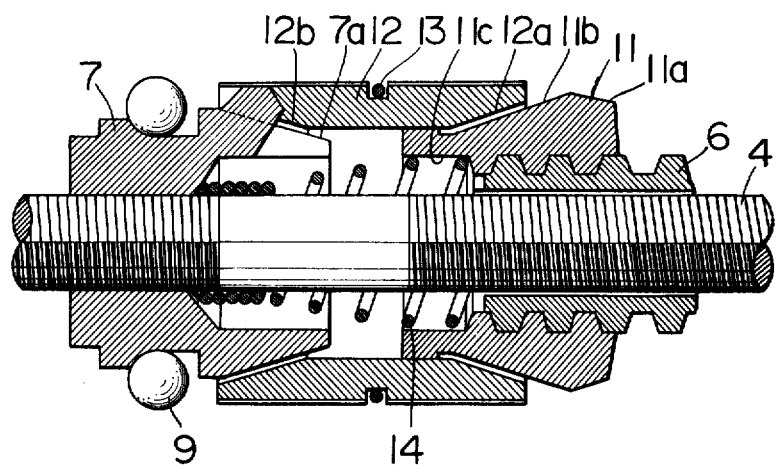
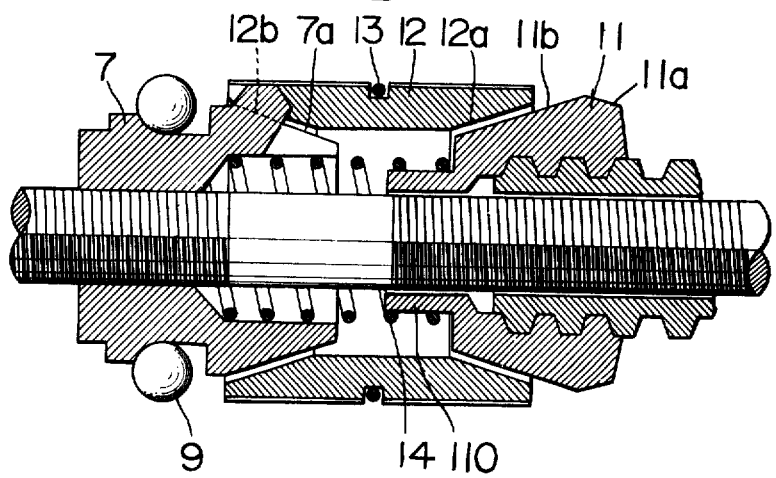

COASTER BRAKE FOR A BICYCLE

This invention relates to a coaster brake hub adapted to apply brake action by back pedaling of a bicycle.

conventionally, a coaster brake is provided with a clutch cone which causes, during normal rotation of pedals of a bicycle, a driving means to be engaged with a rotation transmitting member fixed to a hub shell so as to transmit the rotary force from the driving means to the hub shell, and during reverse rotation of pedals causes the clutch cone to be moved axially of a main shaft for urging brake shoes toward an inner surface of the hub shell.

This clutch cone is, an above mentioned, rotated integrally with the driving means during the pedals normal rotation. On therefore the other hand, it is necessary to bring the rotation to a halt for moving the clutch cone in an axial direction thereof during the pedal's reverse rotation. However, in a conventional coaster brake hub, there was a defect that an inferior changing action of a clutch cone makes it impossible not only to rapidly actuate the brake but also to continue the brake action.

In a conventionally provided coaster brake, even though a cyclist reversely rotates the pedals for brake action so as to cause a driving means to be reversely rotated, a clutch cone may not immediately axially move to result in occurrence of reverse rotation together with the driving means. Therefore a rapid brake effect cannot be exerted in spite of the brake action.

Further, when the pedals are still reversely rotated even after completion of braking, the above mentioned clutch cone is so frictionally engaged with brake shoes that a brake cone is not immediately disconnected from the brake shoes but continues for a while in engagement with the latter, so that the braking action continues with resulting interference with the bicycle's running.

The present invention has been directed to eliminate the above mentioned disadvantages. It is a main object of the invention to provide a coaster brake hub capable of rapidly and exactly exerting the brake action and also quickly releasing the brake action upon stopping of the back pedaling after completion of the brake action so that continued brake effect may be surely eliminated.

It is another object of the invention to provide a coaster brake hub durable in long use such that it is not damaged even though back pedaling for braking makes larger the reverse rotary angle, namely, a cyclist may back-pedal in a larger rotary torque than required.

It is a further object of the invention to provide a coaster brake hub which is not affected at all in function even if heat is generated at the inner surface of a hub shell rotating in contact with brake shoes during the brake action for a bicycle.

It is a still further object of the invention to provide a coaster brake hub simple in construction, readily available for an existing one, inexpensive in manufacturing cost and highly economical.

Further, the invention has been so directed that between a brake cone and a clutch cone is provided a clutch spring which is adapted to apply a predetermined rotary resistance to the clutch cone during reverse movement of a driving means, namely, during brake action, which clutch spring acts to allow the clutch cone to be immediately axially moved during reverse movement of the driving means so as to make it possible to effect a rapid brake action. In addition, the clutch spring is formed of a coil-shape to be contracted when the clutch cone is axially moved as aforegoing, whereby the restoring force produced by contraction of the spring makes it possible to rapidly release the brake action at the same time back pedaling ceases.

The above described object and further objects of the invention will be clearly understood with the description hereinafter and characteristics of the same will be clarified in accordance with the accompanying drawings, in which;

FIG. 1 is an elevation view partly in section of a coaster brake hub according to the invention, showing a hub shell in normal rotation by pedals, FIG. 2 is an elevation view thereof partly in section, showing a hub shell in reverse rotation by back pedaling, and FIGS. 3 and 4 show modified embodiments and are enlarged londitudinal sectional views of principal portions thereof.

Referring to the drawings, an embodiment of a coaster brake in accordance with the present invention will be described in detail hereinafter.

The reference numeral 1 denotes a hub shell provided with flanges 1a and 1b having bores perforated for attaching spokes of a bicycle wheel thereto, which is formed of a cylindrical shaped inner surface and provided at a substantially intermediate portion thereof with a rotary transmitting member 3 having an outer tapered face.

A hub shaft 4 penetrates through the center of the hub shell 1 and is rigidly fixed to a bicycle frame member (not shown in the drawings). The hub shaft 4 is provided at one end portion thereof with a driving means 6 through a bearing means 5 in a freely normally and reversely rotatable relation with respect to the hub shaft while at the other end of the hub shaft is fixed thereto a brake cone 7 having an outer tapered face 7a. The hub shaft is thus freely rotatably supporting the hub shell 1 through bearing means 8 and 9 between the driving means 6 and the brake cone 7.

The afore described driving means 6 has one end portion protruded outwardly axially of the hub shell 1 for fixedly supporting a sprocket wheel 10 thereto. A cylindrical body of the driving means extends inwardly of the hub shell 1 and is provided with a threaded screw at an outer periphery of the body.

This threaded screw is a right-handed screw with which a cylindrical clutch cone 11 is screwably engaged. The clutch cone 11 is adapted to engage with the tapered face of the rotary transmitting member 3 for transmitting the driving force to the hub shell from the driving means 6 when the driving means is rotated in the normal direction. On the other hand, when the clutch cone 11 is disengaged from the rotary transmitting member 3, the clutch cone 11 at the same time, urges brake shoes 12 in an axial direction of the hub shaft thereby to expand the brake shoes for controlling the hub shell rotation. The clutch cone 11 is provided at an inner surface thereof with a right-handed threaded screw engagable with the screw thead of the driving means, and provided at an outer periphery thereof with a tapered face 11a engagable with an inner surface of the rotary transmitting member 3 and an outer tapered face 11b engagable with the inner tapered faces of brake shoes 12. The brake shoes 12 engagable with the outer tapered face of the clutch cone 11 are, as is well known, formed of a plurality of divided cylindrical members which have at the outer periphery thereof a controlling surface brought in contact with the inner surface of the hub shell 1 respectively and, at both end portions of the inner surface thereof inner tapered faces 12a and 12b respectively. Furthermore, at the center of an outer periphery of each brake shoe is provided a spring 13 which coils around the brake shoes to be enlarged or contracted in a diameter. Thus the brake shoes are nonrotatably mounted relative to to the brake cone 7.

The reference numeral 14 denotes a clutch spring which is constituted mainly of a coil spring and provided internally of the abovementioned coaster brake hub between the brake cone 7 and the clutch cone 11. When a cyclist pedals a bicycle in reverse to cause the driving means 6 to be reversely rotated for brake action, the clutch spring 14 serves for applying rotary resistance to the clutch cone 11 so as to prevent the latter from reversely rotating together with the driving means 6 and to allow the clutch cone 11 to be rapidly axially moved by means of the threaded screw. Namely, the clutch spring 14 is expanded or contracted by virtue of the drive force transmitted from the driving means 6. When the driving means 6 is normally rotated the clutch spring can rotate together and in a light touch with the same to apply almost no resistance on the clutch cone and also when the driving means is reversely rotated the clutch spring applies the resistance to the clutch cone 11 to be held in a fixed state for preventing the clutch cone 11 from rotating together with the driving means 6 thereby to rapidly move the clutch cone 11 axially of the hub shaft.

Further, the clutch spring 14 is formed of a coil spring which winds in the reverse direction of the right-handed threaded screw of the clutch cone, i.e., of the left-handed turns, and has an outer diameter almost equal to or slightly larger than an inner diameter of the clutch cone 11. One end of the clutch spring 14 is forcibly inserted internally of a cylindrical body of the clutch cone 11, while the other end of the same is forcibly inserted internally of a cylindrical body of the brake cone 7 so that the clutch spring 14 is thus fixed within the hub shell.

Incidentally, it is preferable that the other end of the clutch spring 14 is fixed to the hub shaft 4 besides being, as abovementioned, fixed to the brake cone 7. The clutch spring is preferably also constructed so that it is forcibly inserted into the cylindrical body of the brake cone 7, which body has the inner diameter equal to or slightly larger than the outer diameter of the clutch spring 14 to thereby get free of the clutch cone during contraction thereof, namely, during normal rotation of the driving means 6.

In addition, one end of the clutch spring 14 is in contact with a notched portion 11c formed at an inner surface of the cylindrical body of clutch cone 11 and the other end of the same is in contact with the inside bottom of the cylindrical body of brake cone 7, so that the clutch spring is thus caused to be contracted by an axial movement of the clutch cone 7.

In this construction, when the driving means 6 is normally rotated, the rotary force therefrom is transmitted to the clutch cone 11 to cause it to be rotated. The rotation of the clutch cone 11 causes the contraction of clutch spring 14 inserted into the cylindrical body of the clutch cone resulting in little contact of the spring 14 with the clutch cone 11. Therefore the clutch cone 11 is scarcely affected by the rotary resistance from the spring 14 so as to rotate together with the driving means 6, whereby the rotary force is transmitted from the driving means 6 to the hub shell 1. In this case, the outer periphery of the spring 14 comes in contact with the inner surface of cylindrical body of the clutch cone 11 to the extent of holding contraction of the spring 14, which may not at all interfere with rotation of the clutch cone 11. On the other hand, when the driving means is reversely rotated the reverse rotary force which is transmitted therefrom to the clutch cone 11 allows the clutch spring to be expanded so that a slip generated on the inner surface of the clutch cone is removed, thus the clutch spring 14 is integrally fixed to the clutch cone 11. Consequently, since the clutch cone 11 is applied with a greater rotary resistance by locking of the clutch spring 14 and the relative rotation is generated by this resistance between the driving means and the clutch cone 11, the clutch cone 11 is only axially moved while urging the spring 14 and forces the brake shoes 12 to be radially expanded for bringing them into contact with the inner surface of hub shell 1 thereby controlling rotation of the hub shell 1.

Furthermore, when the brake action has, as abovementioned, finished to release reversion of pedals, the integration of the clutch spring 14 with the clutch cone 11 is instantly removed, at the same time, the restoring force against compression of the clutch spring 14 during an axial movement of the clutch cone 11 by the above mentioned integration, acts to allow the clutch cone 11 to be immediately moved in a return axial direction for eliminating expansion of brake shoes thereby to remove the brake locking thereof.

Incidentally, the action that the clutch cone 11 is disengaged with brake shoes 12 and engaged with the rotation transmitting portion 3 of the hub shell 1, can be quickly done by the restoring force of clutch spring 14.

The embodiment described heretobefore has the clutch spring 14 inserted at one end thereof into the cylindrical portion of the clutch cone 11, and also fixed at the other end of the same to the brake cone 7 or the like, or inserted into the cylindrical body of the brake cone 7. In addition, it is preferable to insertibly mount, as shown in FIG. 3, the other end of the clutch spring 14 onto an outer periphery of the hub shaft 4.

In this case, the outer diameter of hub shaft 4 is made slightly larger than the inner diameter of clutch spring 14, that is, one end (the left side of the spring in the drawing) of the spring 14 has an inner diameter slightly smaller than an outer diameter of the hub shaft 4.

The dimension of these diameters of both clutch spring 14 and hub shaft 4 has a relative connection with each other. Namely, it is optional to set the outer diameter of the hub shaft 4 on the basis of the inner diameter of clutch spring 14, or to set the inner diameter of the left side portion of the latter based on the former.

In this construction, the rotation force caused by normal rotation of the driving means 6 is, similarly to the former embodiment, transmitted therefrom to the clutch cone 11 to contract the clutch spring 14, where the former rotates together with the driving means 6 with almost no resistance so that the left end portion of clutch spring 14 is tightly wound about the hub shaft 4 thereby to be fixedly supported thereto. Consequently, the clutch cone 11 is rotated together with the driving means 6 and not with the clutch spring 14 to result in causing the hub shell 1 to be rotated. Under these conditions, the rotary force caused by reverse movement of the driving means, is transmitted from the clutch cone 11 to the clutch spring 14 and allows the spring to be expanded so that a slip of the spring on the inner surface of clutch cone 11 is removed and the spring becomes integrated with the clutch cone 11 although being slidable with reference to the hub shaft 4. Accordingly, under a predetermined torque the clutch spring 14 and the hub shaft 4 are in contact and integrated with each other because the former with an inner diameter slightly smaller than an outer diameter of the latter, is forcibly insertibly mounted onto the latter so that the both are made non-rotatable relative each other up to a predetermined torque exerted thereon, thus resulting in applying the rotary resistance on the clutch cone 11 integrated with the spring 14.

The above-mentioned rotary resistance causes a relative rotation between the clutch cone 11 and the driving means 6 to result in only axial movement of the former while it is urging the spring 14, thus, brake shoes 12 are urged to be expanded for coming into contact with the inner surface of the hub shell 1 at the outer surface of brake shoes thereby to control the rotation of the hub shell.

In this case, if the above mentioned torque is in excess of a predetermined torque, the spring 14 may advance in expansion so as to become more fixed in a relation to the clutch cone and, the spring is separated from the surface of the hub shaft to become rotatable, i.e., slidable relative thereto. From this reason, even if a torque in excess of a predetermined value is applied on the spring 14, the spring 14 may not at all be damaged because of a coordinate rotation thereof with the clutch cone 11.

Incidentally, in the construction described heretobefore it is preferable to insertibly mount the clutch spring 14 onto the hub shaft 4 in a manner, as shown in FIG. 3, that the left side portion windings of the former are closely gathered.

In the embodiment described heretobefore, the hub shaft 4 is fixedly mounted directly thereon with one end of the clutch spring 14. However it is preferred that the hub shaft 4 is provided thereon with a sleeve to which the clutch spring is mounted at one end thereof or the brake cone is provided integrally with a cylindrical portion of a smaller diameter to be attached with one end of the clutch spring.

Additionally, in the above mentioned embodiment, one end of the clutch spring 14 is inserted internally of the clutch cone 11 and the other end thereof is insertibly mounted onto the outer periphery of the hub shaft 4, but the clutch cone 11 may, as shown in FIG. 4, be integrally provided with a cylindrical body 110 of a smaller outer diameter, and the outer periphery of the body 110 is inserted into one end of the clutch spring and also the other end thereof is inserted internally of the cylindrical brake cone 7. In such a case, the clutch spring 14 has an outer diameter thereof equal to or slightly larger than an inner diameter of the brake cone 7, and has an inner diameter thereof equal to or slightly smaller than an outer diameter of the portion 110 of a smaller diameter.

As is clearly understood in the aforegoing description, in a coaster brake for a bicycle in accordance with the present invention, the clutch spring scarcely applies the resistance on the clutch cone during normal pedalling. Accordingly if a cyclist riding on a bicycle rotates the pedals in reverse to act the brake, the clutch cone is applied with the strong rotary resistance caused by the clutch spring so as to be moved axially of the hub shaft, resulting in the extremely rapid brake action for a bicycle. Furthermore, after this brake action the release of reverse rotation of the pedals may permit the clutch cone to be immediately restored in the axial direction of the hub shaft, whereby occurrence of remaining brake action for a bicycle may exactly be eliminated.

Still further to the invention, even if the torque of back pedaling is made greater during brake action, one end of the clutch spring becomes slidable by the torque more than the predetermined, amount and accordingly, the spring is not held encroachingly at each end thereof internally of both cones of the clutch and the brake or unduly expanded. Therefore no matter how the brake may be actuated there is no fear that the clutch spring will be damaged. In addition, even though the frictional heat generated from contact of the brake shoe with the inner surface of hub shell during brake action may cause the clutch spring to be expanded, the spring becomes slidable relative to the clutch cone, thereby making it possible to eliminate a fault that the clutch spring may be damaged due to such expansion caused by heat generation.

While several embodiments of this invention have been described using specific terms, such description is for illustrative purpose only, and it is to be understood that changes and variations may be made without departing from the spirit or scope of the following claims.

What is claimed is:

1. A coaster brake hub for a bicycle comprising:
   a. a hub shell,
   b. a fixed member comprising a fixed hub shaft penetrating through the center of said hub shell and a brake cone which is located at one side internally of said hub shell and fixedly mounted to said hub shaft, said brake cone having an outer tapered face thereon,
   c. a driving means at the other side internally of said hub shell and mounted to said hub shaft in a rotatable relation therewith, said driving means fixedly supporting a sprocket wheel of a bicycle to the same,
   d. a cylindrical clutch cone, with an outer tapered face, screwably engaged with said driving means for transmitting the rotary force from the driving means to said hub shell during normal rotation of said driving means,
   e. a plurality of brake shoes having two inner tapered faces which are frictionally engagable with said tapered faces of said brake cone and said clutch cone respectively, and
   f. a coil-shaped clutch spring mounted between said fixed member and said clutch cone so as to apply a given rotary resistance to said clutch cone during reverse rotation of said driving means, said clutch spring having lengthwise one end connected to the outer periphery of one of said fixed member and said clutch cone and having lengthwise the other end connected to the other one of said fixed member and said clutch cone so that during normal rotation of said driving means said lengthwise one end of the clutch spring becomes slidable and the other end becomes fixed, and, during reverse rotation of said driving means, said lengthwise one end of the clutch spring becomes fixed and the other end thereof becomes slidable under the effect of torque in excess of a given amount.

2. The coaster brake hub according to claim 1, wherein the inner coil diameter of said clutch spring at lengthwise one end thereof is slightly smaller than the outer diameter of said hub shaft so as to be connected to the outer periphery thereof, and the inner coil diameter of said clutch spring at the other end thereof is not larger than that of a notched portion defined in said clutch cone so as to be connected thereto.

3. The coaster brake hub according to claim 2, wherein a sleeve is nonrotatably mounted onto the outer periphery of the hub shaft, said sleeve being connected at the outer periphery thereof with the lengthwise one end of said clutch spring.

4. The coaster brake hub according to claim 1, wherein said clutch spring is frictionally fixed to said fixed member and is coiled with adjacent turns in close contact with each other at one end portion of the spring.

5. The coaster brake hub according to claim 1, wherein said clutch cone extends toward said brake cone side and comprises a cylindrical portion of a smaller diameter, said cylindrical portion having an outer diameter slightly larger than the inner coil diameter of one end of said clutch spring so that the one end of the spring may be connected to the outer periphery of said cylindrical portion, and the outer coil diameter of the other end of said spring is no smaller than that of a notched portion defined in said brake cone so that the other end of the spring may be connected with the notched portion of said brake cone.

* * * * *